ns patent.

United States Patent [19]
Barrett et al.

[11] 3,896,001
[45] July 22, 1975

[54] MALTING PROCESSES

[75] Inventors: James Barrett, Tonbridge; Brian Heys Kirsop, Redhill; Godfrey Henry Oliver Palmer, Copthorne, all of England

[73] Assignee: Brewing Patents Limited, London, England

[22] Filed: Nov. 17, 1972

[21] Appl. No.: 307,631

[30] Foreign Application Priority Data
Nov. 29, 1971 United Kingdom............... 55410/71

[52] U.S. Cl. ................................................. 195/71
[51] Int. Cl. ............................................. C12c 1/02
[58] Field of Search ................. 195/71, 69, 70, 101; 426/28, 30, 64

[56] References Cited
UNITED STATES PATENTS

| | | | |
|---|---|---|---|
| 3,085,945 | 4/1963 | Luchsinger et al. | 195/70 |
| 3,149,053 | 9/1964 | Kneen et al. | 195/70 |
| 3,168,449 | 2/1965 | Hollenbeck et al. | 195/70 |
| 3,647,473 | 3/1972 | Stowell et al. | 195/71 X |
| 3,708,002 | 1/1973 | Collier et al. | 195/71 X |
| 3,754,929 | 8/1973 | Palmer | 195/70 X |

Primary Examiner—Lionel M. Shapiro
Attorney, Agent, or Firm—Wenderoth, Lind & Ponack

[57] ABSTRACT

A process for the production of malt comprises removing a part of the husk of the barley, steeping the barley, treating the barley with aqueous mineral acid and with gibberellic acid, and allowing the barley to germinate. The combination of treatment steps is claimed to improve the rate of germination.

5 Claims, No Drawings

MALTING PROCESSES

The present invention relates to the production of malt.

It is already known that the malting process may be accelerated and the production of extractable material increased by the application of gibberellic acid to the grain during or after steeping in water. The use of gibberellic acid has become widespread in commercial malting in recent years. Gibberellic acid is an expensive material. As a result of commercial experience it has become conventional practice to apply gibberellic acid in an amount of about one-fourth part per million on the basis of the weight of grain under treatment. No benefit is found in increasing the gibberellic acid above that level when the malting process is carried out in the conventional manner, in which the barley is steeped in water, rested in air for a period of up to 1 day, re-steeped in water and then germinated for about 5 days before kilning.

It has already been shown that the malting process can be somewhat accelerated by removal of at least part of the husk of the grain before commencing the malting process.

It has been proposed in British Pat. No. 1,163,067 to employ a dry mechanical method to remove a major proportion of husk without damaging the function of the aleurone layer with the object of damaging the grain to the extent of preventing or inhibiting substantial rootlet growth whilst at the same time maintaining the aleurone layer substantially intact so that it may respond to the stimulatory effect of gibberellic acid to release the enzymes which modify the endosperm of the barley.

That process suffers from the disadvantage that the resulting malt is essentially free of husk. In conventional brewing the husk forms a filter layer in the mash tun for filtration of the wort, so that some form of auxiliary filtration medium must be employed in brewing in conjunction with malt produced in that way.

Other methods for accelerating the malting process involving partial removal of the husk of barley without substantially affecting the germination of the grain are also known, however. In our British Pat. No. 1,264,822 we have described a process in which the thin distal end of the husk is selectively abraded to perforate the pericarp and testa so as to admit exogenous gibberellic acid to that portion of the aleurone layer most distant from the embryo. In consequence that portion of the aleurone layer is subjected to the stimulatory effect of gibberellic acid more rapidly than in conventional malting procedures, in which gibberellic acid is transported from the embryo. The process of our said British Pat. No. 1,264,822 has the advantage that the resultant malt has a husk which is substantially intact and coherent, since the abrasion procedure results in a weight reduction of the barley of only about 0.1 – 0.2 percent (corresponding to about 1 – 2 percent of the total weight of the husk). The amount of husk removed may be substantially higher, however, without loss of the advantage of maintaining a substantially intact husk on the individual corns.

The object of the abrasion treatment is to wear away the husk at the distal end (where the husk is thinnest) and to perforate the pericarp and testa, which are virtually impervious to gibberellic acid, so as to permit entry of the gibberellic acid. Shattering of the husk at the same time should be avoided. The total reduction in grain weight between these two extremes varies considerably in accordance with the procedure employed for the abrasion treatment and in particular on the coarseness of the abrasive surfaces and on the moisture content of the barley subjected to the abrasive treatment. It is in general preferred to reduce the weight of the barley by 0.1 – 1 percent during the abrasion treatment. Many forms of apparatus, which rely on the impingement of the corns on an abrasive surface, may be employed to achieve this result.

The pretreatment of barley by abrasion to permit early access of externally applied gibberellic acid to the aleurone layer leads to a substantial acceleration of the malting process and to the production of an improved malt having an increased content of enzymes, so that it is possible to employ increased quantities of non-malted carbohydrate adjuncts with it in brewing beer, as compared with what may be employed with malts produced by traditional methods.

It has been shown in U.S. Pat. No. 3,085,945 that the growth of rootlets in the production of malt can be inhibited by the acidulation of the steep water. Since the rootlets ultimately are detached from the grain, the inhibition of rootlet growth decreases the malting loss and it is for that purpose that the acidulation treatment was proposed. No acceleration of the malting process has been reported to result from acidulation in the malting or normal barley.

It has already been recognised in U.S. Pat No. 3,149,053 that with such acid treatment, there is a tendency for micro-organisms such as yeasts, to grow on the husk of the grains within the germination period employed in conventional malting. Such growth of microorganisms leads to off-flavours and generally decreases the acceptability of the malt. U.S. Pat. No. 3,149,053 puts forward various suggestions for the purpose of retarding the growth of such micro-organisms.

We have now found that the acidulation of the steep water conjoined with the application of gibberellic acid in an amount of at least 0.1 part per million to barley which has been subjected to a partial dehusking treatment sufficient to perforate the pericarp and testa leads to a substantial acceleration of the malting process with the result that it is possible to achieve an acceptable level of hot water extract in a substantially shorter time. In particular we have found that this treatment is exceptionally effective where the grain has been subjected to a pretreatment in which a limited part of the husk has been removed, but to an extent to perforate the pericarp and testa at the distal end of the grain to admit gibberellic acid to the aleurone layer. The removal of husk to the extent of 0.1 – 0.3 percent of the weight of the grain in accordance with British Pat. No. 1,264,822 is suffient when 0.75 – 2 p.p.m. e.g. 1 p.p.m., of gibberellic acid is administered to the grain. A somewhat larger removal of husk at the distal end, corresponding to a grain weight reduction of about 0.5% allows lower levels in the range of 0.1 – 0.3 p.p.m., e.g. 0.25 p.p.m., of gibberellic acid to be used, whilst obtaining the same acceleration of the process.

In the treatment of normal barley with acid there is believed to be little or no effect on the endosperm as a result of the acid treatment, since the embryo is believed to act as a barrier to the uptake of acid into the endosperm.

In contrast in the process of the present invention the added acid penetrates the endosperm through the perforations in the pericarp and testa and it is believed that the acid has a synergistic effect with gibberellic acid on the breakdown of the endosperm. Particular advantages of the process of the present invention are that it leads to an acceleration in the reduction of the β-glucan content of the malt, and in the increase in the content of soluble nitrogenous substances in the malt. The acceleration of the breakdown of the hemicellulosic and proteinaceous matter of the endosperm structure permits satisfactory modified malt to be obtained more quickly than can be achieved by the use of abraded barley and gibberellic acid alone. Whilst it is preferred to employ acid of sufficient concentration to inhibit rootlet growth (and thus enjoy the consequent reduction of process loss) it is possible to obtain the accelerated malting resulting from the use of acid in conjunction with gibberellic acid with acid of a concentration insufficient to completely inhibit the growth of roots.

It is unusual to-day to rest the grain in air for a period of up to one day after a first steeping treatment and then to resteep in water. We have found that it is particularly advantageous to acidulate the water in the resteeping stage and that the acidulation of the water in the first steeping stage does not lead to further improvement. Alternatively acid may be applied to the grain at the end of the resteeping stage.

We find if the acidification treatment is carried out with water at a pH below about 3.5 the root growth is almost entirely inhibited. We find that a substantial acceleration of malting will take place with a concentration as low as about 0.003N sulphuric acid or other strong mineral acid, even through the rootlet growth is not entirely inhibited. Although quite concentrated acid may be employed it is preferred to employ sulphuric acid at a concentration of about 0.01N. Acid of concentration up to about 0.05N and even up to 0.5N may be employed. However the use of concentrated acid is preferably avoided by reason of possible corrosion problems with equipment and hazards to operating personnel and the most preferred acid level is 0.01N – 0.05N.

The extent to which the malting of barley, having a perforated pericarp and testa is accelerated by the application of mineral acid in conjunction with gibberellic acid is, as indicated above, somewhat dependent on the extent to which the grain has undergone pretreatment by abrasion to render the pericarp and testa permeable to gibberellic acid.

We have found that where the grain has been subjected to an abrasion treatment to remove a limited amount of husk as described in our British Pat. No. 1,264,822 and is then treated with appropriate concentrations of mineral acid and gibberellic acid the malting of the grain has proceeded sufficiently far to provide an acceptable value of hot water extract in a total process time of three days (40 hours' germination after resteeping).

On the other hand, where the barley has not been subjected to an abrasion pretreatment of the above-mentioned type it is found that the development of hot water extract is slower. In that case hot water extract is found to have reached a desirable value only after a total process time of about 5 days. Likewise the treatment of abraded barley with gibberellic acid, but without mineral acid, is found to require a total process time of about 4 days.

Employing the process of the present invention it is found that 40 hours' germination time is adequate (giving a total processing time of 3 days) and it is desirable to terminate the germination after 35 – 45 hours since undesirable micro-organism growth is observable by eye after about 50 – 60 hours' germination.

The termination of the germination may be effected in the conventional manner by kilning or by direct use of the green malt, for example to prepare a malt syrup.

EXAMPLE I

In order to demonstrate the improvements obtained by the process of the invention malting was carried out under the conditions set out below using normal barley as control and abraded barley, selectively abraded at the distal end as described in British Pat. No. 1,264,822. The accompanying Tables 1 and 2 show the development of the content of Hot Water Extract (H.W.E.) and Total Soluble Nitrogen (T.S.N.).

The results shown in Tables 1 and 2 were obtained as follows:

| | | | |
|---|---|---|---|
| A | Abraded barley (0.01N acid) (0.2% weight reduction) | (a) (b) (c) | 8 hr. steep in water, 16 hr. air-rest, 8 hr. steep in 0.01N sulphuric acid. 0.5 p.p.m. of gibberellic acid sprinkled onto grain after (a) and (c). Growth at 20°C. |
| B | Abraded barley (0.006N acid) (0.2% weight reduction) | (a) (b) (c) | 8 hr. steep in water, 16 hr. air-rest, 8 hr. steep in 0.006N sulphuric acid. 0.5 p.p.m. of gibberellic acid sprinkled onto grain after (a) and (c) Growth at 18°C. |
| C | Normal barley (0.006N acid) | (a) (b) (c) | 8 hr. steep in water, 16 hr. air-rest, 24 hr. steep in 0.006N sulphuric acid. 1 p.p.m. of gibberellic acid sprinkled onto grain after (c). Growth at 18°C. |
| D | Normal barley (Control) | (a) (b) (c) | 8 hr. steep in water, 16 hr. air-rest, 24 hr. steep in water. 1 p.p.m. gibberellic acid sprinkled onto grain after (c). Growth at 18°C. |
| E | Abraded barley (0.2% weight reduction) | (a) (b) (c) | 8 hr. steep in water, 16 hr. air-rest, 8 hr. steep in water. 0.5 p.p.m. gibberellic acid sprinkled onto grain after (a) and (c). Growth at 18°C. |

It will be seen in the case of treatments A and B that an almost complete development of hot water extract had been achieved after three days' process time (40 hours' germination after resteeping), thus showing substantial reduction in process time as compared with the conditions indicated in C - E.

The conjoint acid steeping operation with application of gibberellic acid to abraded barley leads to a far more rapid development of a maximum value of the hot water extract than can be achieved by the application of gibberellic acid to abraded barley steeped in water.

Table 1

Development of Hot Water Extract

| Steeping Procedure (See Text) | Barley | Hot Water Extract (lb/qtr) and Total Malting Time | | | |
|---|---|---|---|---|---|
| | | 2 days | 3 days | 4 days | 5 days |
| D | Normal | — | 91.4 | 101.1 | 103.3 |
| C | Normal | — | 88.9 | 102.1 | 103.2 |
| E | Abraded | 84.0 | 102.1 | 103.2 | 103.2 |
| B | Abraded | 84.0 | 103.5 | 104.1 | 104.4 |
| A | Abraded | 90.0 | 103.3 | 104.5 | 104.8 |

Table 2

Development of Total Soluble Nitrogen

| Steeping Procedure (See Text) | Barley | Total Soluble Nitrogen (mg/ml) and Total Malting Time | | | |
|---|---|---|---|---|---|
| | | 2 days | 3 days | 4 days | 5 days |
| D | Normal | — | 0.43 | 0.54 | 0.63 |
| C | Normal | — | 0.51 | 0.69 | 0.74 |
| E | Abraded | 0.35 | 0.48 | 0.74 | 0.84 |
| B | Abraded | 0.58 | 0.82 | 0.84 | 0.82 |
| A | Abraded | 0.59 | 0.92 | 0.94 | 0.90 |

EXAMPLE III

In this Example the barley had been abraded so as to remove a rather large proportion of husk, being sufficient to reduce the weight of the barley by 0.5%. This rather greater removal of husk (corresponding to about 5% of the weight of the husk) permitted a much smaller weight of gibberellic acid to be employed.

| | | | |
|---|---|---|---|
| F | Abraded barley (0.01N acid) (0.5% weight reduction) | (a) | 8 hr. steep in water, |
| | | (b) | 16 hr. air-rest, |
| | | (c) | 8 hr. steep in 0.01N sulphuric acid. 0.125 p.p.m. of gibberellic acid sprinkled onto grain after (a) and (c). Growth at 20°C. |
| G | Abraded barley (0.01N acid) (0.5% weight reduction) | (a) | 8 hr. steep in water, |
| | | (b) | 20 hr. air-rest, |
| | | (c) | 8 hr. steep in 0.01N sulphuric acid. 0.125 p.p.m. of gibberellic acid sprinkled onto grain prior to acid steep at 11 hr. and 24 hr. |

The conditions of F and G were repeated without sulphuric acid in the resteeping water and the development of hot water extract and total soluble nitrogen are recorded below, in comparison with the results obtained with inclusion of acid in the resteeping water.

F

| Total Malting time (excluding kilning) | H.W.E. (lb/qtr) | T.S.N. mg/ml |
|---|---|---|
| Abraded (acidulated) 3 days | 103.5 | 0.91 |
| Abraded (no acid) 3 days | 101.5 | 0.77 |
| Abraded (no acid) 4 days | 103.8 | 0.88 |

G

| Total Malting time (excluding kilning) | H.W.E. (lb/qtr) | T.S.N. mg/ml |
|---|---|---|
| Abraded (acidulated) 3 days | 104.0 | 0.85 |
| Abraded (no acid) 3 days | 102.4 | 0.78 |
| Abraded (no acid) 4 days | 103.6 | 0.85 |

It will be seen that in this Example also the acid steeping stage had the effect of reducing the total process time by approximately 24 hours. After a total process time of 3 days from the commencement of the first steeping treatment (after about 40 hours' germination) a substantially complete development of hot water extract and total soluble nitrogen had been achieved.

The steep water may be acidulated with other acids at a concentration in the range of 0.003N – 0.5N, more preferably 0.006N – 0.5N in place of sulphuric acid. Other mineral acids, such as hydrochloric acid, nitric acid or phosphoric acid may be employed, but for reasons of economy and convenience sulphuric acid is preferred for this purpose. In tests carried out with 0.01N hydrochloric acid the amount of extract developed at the end of three days processing time was virtually the same as was obtained using 0.006N sulphuric acid. As alternatives to gibberellic acid, the steeped grain may be treated with the growth promoting equivalents of gibberellic acid such as alkali metal salts of the acid and alkyl esters thereof and acyloxy derivatives. The term "gibberellic acid" is used herein to include these eqivalents.

It was stated above that one of the advantages of the conjoint use of mineral acid and gibberellic acid on barley which has been mechanically treated to perforate the pericarp and testa is that it leads to an increase in the rate of breakdown of $\beta$-glucan. It can be shown that at the end of 3 days not only is the total quantity of $\beta$-glucan reduced, but also the viscosity of the $\beta$-glucan is reduced.

EXAMPLE III

Samples of two different varieties of barley were subjected to selective abrasion of the distal end of the corns so as to reduce the weight of the barley by 0.5%. The effects of acidulation with 0.01N sulphuric acid were compared with the effect of unacidifed water in the resteeping stage, 0.25 p.p.m. gibberellic acid being employed in all cases. In all cases the barley was steeped and resteeped for 8 hours, with an intervening air-rest for 16 hours and a final germination time of 40 hours.

The following results were obtained:

Effect of Acidulation on Enzymatic Development and
Degradation of the β-Glucan Fraction During Malting

| Resteep | | H.W.E. (lbs/qtr) | Endo-β-Glucanase Units | Wt./Grams of β-Glucan in 100 g. malt | Specific Viscosity (Centipoises) β-Glucan at 0.3% in water |
|---|---|---|---|---|---|
| (A) | Water | 101.0 | 24.6 | 0.30 | 4.1 |
| | Acidulated Water | 103.4 | 23.4 | 0.20 | 3.4 |
| (B) | Water | 102.0 | 25.3 | 0.30 | 4.7 |
| | Acidulated Water | 103.5 | 23.8 | 0.10 | 2.2 |

Initial Weight.  β-Glucan in 100 gms. barley:
(A) = Gerkra = 0.93 gms.
(B) = Maris Otter = 0.80 gms.

These results show that the breakdown of β-glucan proceeds more quickly in the presence of 0.01N sulphuric acid where the pericarp and testa have been perforated to admit gibberellic acid to the aleurone layer.

EXAMPLE IV

Although the increase in hot water extract resulting from the use of mineral acid in resteeping varies as between different varieties of barley, accelerating acceleratng effect of the treatment has been established with trials carried out with a number of different varieties of barley. Tests were carried out using the same malting conditions as employed in Example III. The following results were obtained:

| Barley: Variety | Hot Water Extract (lbs/qtr) | |
|---|---|---|
| | Water Steep | Acid Steep |
| Proctor | 101.2 | 103.2 |
| Sultan | 100.5 | 102.0 |
| Gerkra | 100.5 | 103.4 |
| Zephyr | 98.4 | 100.6 |
| Julia | 99.7 | 100.3 |
| Maris Otter | 101.5 | 103.2 |

We claim:

1. A process for the production of malt comprising removing at least a part of the husk of the barley in such manner as to perforate the pericarp and testa to render the aleurone layer of the barley accessible to externally applied gibberellic acid, steeping the barley in an aqueous medium, resting the steeped barley in air, resteeping the barley in an aqueous medium, treating the barley with an aqueous mineral acid of a strength in the range of 0.003N –0.5N during or at the end of the resteeping step, applying at least 0.1 p.p.m. gibberellic acid, based on the barley weight, to said barley at or before completion of the resteeping operation, allowing the resteeped barley to germinate for a period of 35–45 hours and then terminating germination before visible growth of micro-organisms has taken place.

2. A process according to claim 1 in which the husk of the barley is partially removed by selective abrasion of the distal end of the individual barley corns to reduce the total weight of the barley by 0.1 –1%.

3. A process according to claim 1 in which the aqueous mineral is sulphuric acid at a strength in the range of 0.006N – 0.05N.

4. A process according to claim 1 in which the husk of the barley is removed by abrasion to reduce the total weight by at least 0.5%.

5. A process according to claim 1 in which the husk of the barley is removed by abrasion to reduce the total weight by at least 0.5%, the acid treatment of the barley is effected with sulphuric acid at a strength in the range of 0.01N – 0.05N and the gibberellic acid is applied in an amount of 0.1 – 0.5 p.p.m.

* * * * *